United States Patent Office 2,826,541
Patented Mar. 11, 1958

2,826,541

METHOD OF MAKING CERAMIC-CLAD METAL STRUCTURES

Harold Barr, Bloomfield, James J. Shyne, Arlington, and Frederick Fahnoe, Morristown, N. J., assignors to Vitro Corporation of America, Verona, N. J.

No Drawing. Application June 15, 1954
Serial No. 437,002

8 Claims. (Cl. 204—181)

Our invention relates to ceramic-clad metal structures and methods for making the same.

As is well known in the art, ceramic materials can withstand very high temperatures and exhibit high corrosion and oxidation resistance at these temperatures. However, the structural strength of ceramic materials is limited, and consequently, it is not possible to use such materials in applications where they might otherwise be suitable. Since certain metals offer very high structural strength at high temperatures but possess poor oxidation resistance at such temperatures, many attempts have been made to produce structures which combine the desirable properties of ceramic materials with the structural strength of these metals. We have discovered a process for producing a ceramic-clad metal structure having the very desirable corrosion and temperature resistance properties of the ceramic and having the structural strength of these metals.

Accordingly, it is an object of the present invention to provide new processes and products of the character indicated.

It is another object of the invention to provide a new process for cladding a metal body with ceramic material.

Yet another object is to provide a novel ceramic-clad metal structure which exhibits high structural strength and excellent oxidation resistance at high temperatures.

Still another object is to provide a process for electrophoretically depositing a coating of ceramic material on a metal body and bonding this material to said body.

Yet a further object of the invention is to provide a method for bonding ceramic material to a metal body by using interposed graded coatings formed from metal and ceramic materials.

Electrophoretic deposition occurs when an electrostatic field is established between two electrodes immersed within a colloidal or gross dispersion of charged particles thus causing migration of the suspended particles toward one of the electrodes and producing a deposit of an adherent coating upon that electrode. Exceptional uniformity of coating thickness and compactness (with a relatively high coating density) are obtained as compared with dipping, spraying, brushing and other more conventional methods of application. Irregularly shaped objects can be coated with excellent uniformity and reproducibility of coating. In application S. N. 386,882, filed October 19, 1953, by F. Fahnoe and J. J. Shyne, there is disclosed a process for electrophoretically depositing metallic coatings upon the surface of a base material. This process forms the starting point for our coating process.

We have discovered that when a mixture of one or more reducible metallic oxides and one or more refractory ceramic materials are electrophoretically codeposited as a coating upon the surface of a metal body and the oxides are subsequently reduced to metal by firing the coated body at high temperatures in a reducing atmosphere, a sintered metal matrix formed from the reduced oxides is produced which is chemically bonded to the body by matrix-metal body codiffusion across their common interface. The sintered refractory ceramic materials are entrapped within the pores of the matrix. The resultant structure, which is called a cermet, retains the structural strength of metal and the oxidation resistance of the ceramic at high temperatures on the order of 700° C. and higher.

The external surface of this cermet because of the composite nature of the electrophoretically deposited coating is somewhat metallic in nature. We have further discovered that a second coating composed entirely of ceramic materials can be electrophoretically deposited over the first coating and sintered at high temperatures to produce a cermet whose external surface is composed entirely of refractory ceramic materials.

For certain very extreme temperature applications, we have found that the cermets thus produced are not entirely satisfactory as the chemical diffusion bond exhibits a tendency to weaken and fail. In these situations we have produced cermets with even stronger bonding by first electrophoretically depositing one or more reducible metallic oxides as a first coating on the metal body and then reducing this mixture to the constituent metals in the manner previously indicated. This first coating then becomes a purely metallic coating diffusion bonded to the underlying metal body. A second coating of mixed reducible metallic oxides and refractory ceramic materials is then electrophoretically codeposited over the first coating and treated as before to form the cermet structure. Again, if desired, an outer coating composed purely of refractory ceramic materials can be electrophoretically deposited over the second coating and subsequently sintered to produce a cermet completely clad with a refractory ceramic outer coating.

It is sometimes desirable to produce cermets of this general type clad with an external layer of metal. We produce such a cladding layer by electrophoretically depositing one or more reducible metallic oxides over the particular cermet used and then reduce the oxide to metal as before. This type of layer will seal off or close up any pores present in the outer surface of the cermet and will also provide additional bonding action.

While the particular materials used in forming these cermets are, of course, variable depending upon the application required, the metal body is generally formed from such metals as molybdenum, the low alloy steels and tungsten; the reducible metallic oxides are generally selected from the oxides of chromium, nickel, cobalt and mixtures thereof. Iron oxide can sometimes be used with one or more of these oxides.

Refractory ceramic materials used are selected from the class composed of the refractory metallic oxides, carbides, borides and silicides.

The following examples set forth certain well-defined instances of the application of this invention. They are, however, not to be considered as limitations thereof, since many modifications can be made without departing from the spirit and scope of this invention.

*Example 1*

A 5 mil coating of a mixture comprising 60% by weight of nickel oxide and 40% by weight of chromium oxide was electrophoretically deposited out of organic media upon the surface of a molybdenum rod ¾" in diameter and ¼" long in the manner described in the above-mentioned patent application S. N. 386,882. The coated rod was then fired at a temperature of 1200° C. in a hydrogen atmosphere for a period between 3 and 5 minutes to reduce the nickel and chromium oxides to their respective metals and form a sintered nickel-chromium coating chemically bonded to the surface of the molybdenum rod by nickel-chromium co-diffusion across the common interface. A second 5 mil coating comprising 50% by weight of the nickel oxide-chromium oxide mixture referred to previously, and 50% by weight of molybdenum disilicide was electrophoretically deposited out of organic media upon the surface of the nickel-chromium coating. The rod was again fired at a temperature between 1150°–1200° C. for a period between 3 and 5 minutes in a hydrogen atmosphere to reduce the nickel and chromium oxides to metal and bond the molybdenum disilicide to the surface of the nickel-chromium coated molybdenum rod.

*Example II*

A 10 mil coating comprising 75% by weight of cobalt oxide and 25% by weight of iron oxide was electrophoretically deposited out of organic media onto the surface of a steel bar. The coated bar was then fired in a hydrogen atmosphere to a temperature of 1125° C. for a period of 5 minutes to produce a cobalt-iron coating chemically bonded to the steel rod in the manner indicated previously. A second 10 mil coating comprising 80% by weight of aluminum oxide and 20% by weight of chromium oxide was electrophoretically deposited over the cobalt-iron coating and the rod thus produced was fired in hydrogen to a temperature of 1200° C. for a period of 5 minutes to reduce the chromium oxide to metallic chromium and bond the aluminum oxide to the surface of the coated rod in the same manner as indicated in Example I.

*Example III*

A 3 mil coating of molybdenum disilicide was electrophoretically deposited on the nickel-chromium-molybdenum disilicide coated rod described in Example I. The coated rod was then fired to a temperature of 1175° C. for a period of 4 minutes to produce the ceramic-clad structure.

*Example IV*

A 6 mil coating comprising 40% by weight of silicon carbide and 60% by weight of nickel oxide was electrophoretically deposited out of organic media upon the surface of a molybdenum rod. The coated rod was then fired in a hydrogen atmosphere to a temperature of 1150° C. for a period of 5 minutes.

Cross sectional analyses established that the nickel oxide had been reduced to nickel in the form of a sintered matrix bonded to the rod. Sintered particles of silicon carbide were found entrapped in the pores of the matrix.

*Example V*

A 7 mil outer coating of silicon carbide was electrophoretically deposited on the silicon carbide-nickel coated rod described in Example IV.

The coated rod was then heated in a hydrogen atmosphere to a temperature of 1225° C. for a period of 7 minutes. By this means, this outer coating was sintered and bonded to the carbide-nickel inner coating.

*Example VI*

A 5 mil coating of nickel oxide was electrophoretically deposited on the silicon carbide clad rod described in Example V.

The rod was then heated to a temperature of 1200° C. for a period of 4 minutes to reduce the nickel oxide to nickel and thus clad the rod with an outer coating of metal. This outer coating exhibited substantially zero porosity.

While we have shown, described and pointed out fundamental novel features of the invention as applied to preferred embodiments, it will be understood that various omissions, substitutions and changes in the form and details of these embodiments may be made by those skilled in the art without departing from the spirit of the invention. It is our intention, therefore, to be limited only as indicated by the scope of the claims which follow.

We claim:

1. The method of producing a cermet structure comprising the steps of electrophoretically codepositing out of liquid media upon the surface of a molybdenum substrate a coating composed of a mixture of 60% by weight nickel oxide and 40% by weight chromium oxide, firing said coated substrate in a hydrogen atmosphere at a temperature of about 1200° C. to reduce the oxides to the metals, electrophoretically codepositing out of liquid media upon the surface of the coated molybdenum substrate a second coating composed of a mixture of 50% of a mixture comprising 60% by weight of nickel oxide and 40% by weight of chromium oxide with 50% by weight of molybdenum disilicide, and firing said second coated substrate in a hydrogen atmosphere at a temperature between 1150 and 1200° C. to reduce the oxides to the metals and chemically bond the molybdenum disilicide to the surface of the coated molybdenum substrate.

2. A process in accordance with claim 1 which includes electrophoretically depositing upon the second coated substrate a third coating composed of molybdenum disilicide, and firing the coated substrate at a temperature of about 1175° C. to produce a sintered metal molybdenum disilicide layer chemically bonded to the molybdenum substrate.

3. The method of producing a cermet structure comprising the steps of electrophoretically codepositing out of liquid media upon the surface of a steel substrate a coating composed of a mixture of 75% by weight of cobalt oxide and 25% by weight of iron oxide, firing said coated substrate in a hydrogen atmosphere at a temperature of about 1125° C. to reduce the oxides to the metals, electrophoretically codepositing upon the surface of the coated steel substrate a second coating comprising 80% by weight of aluminum oxide and 20% by weight of chromium oxide, firing the second coated substrate in a hydrogen atmosphere at a temperature of about 1200° C. to reduce the oxide to metallic chromium and chemically bond the aluminum oxide to the surface of the coated steel substrate.

4. The method of producing a cermet structure comprising the steps of electrophoretically codepositing out of an organic medium a coating composed of a mixture of 40% by weight of silicon carbide and 60% by weight of nickel oxide upon the surface of a molybdenum substrate, firing the coated substrate in a hydrogen atmosphere at a temperature of about 1150° C. to reduce the oxide to metallic nickel and form a sintered nickel-silicon carbide ceramic layer chemically bonded to the molybdenum substrate.

5. A process in accordance with claim 4 which includes electrophoretically depositing upon the surface of the coated molybdenum substrate a second coating of silicon carbide, and firing the second coated substrate in a hydrogen atmosphere at a temperature of about 1225° C. to sinter and bond the second outer coating to the molybdenum substrate.

6. The method of producing a cermet structure in accordance with claim 5 which includes electrophoretically depositing upon the second coated substrate a coating of nickel oxide, and firing the coated substrate in a hydrogen atmosphere at a temperature of about 1200° C. to reduce the nickel oxide to nickel and clad the rod with an outer coating of metallic nickel.

7. The method of producing a cermet structure comprising the steps of electrophoretically depositing out of liquid media upon the surface of a metal substrate selected from the class of metals consisting of molybdenum, tungsten and the low alloy steels, a first coating composed of reducible metallic oxide particles of the class consisting of chromium, nickel, cobalt and iron oxides; heating said coated substrate in a reducing atomsphere to reduce the oxide particles in said first coating to metal and to form a sintered first layer chemically bonded to said substrate; electrophoretically codepositing out of liquid media upon said first layer a second coating composed of a mixture of metallic oxide and refractory ceramic particles, said last mentioned metallic oxides being selected from the class consisting of chromium, nickel, cobalt and iron oxides and said ceramic particles being selected from the class consisting of molybdenum disilicide, aluminum oxide and silicon carbide; heating said coated substrate in a reducing atmosphere at a temperature high enough to reduce said metallic oxide in said second coating to metal without reducing said ceramic material and to form a sintered metal-ceramic second layer chemically bonded to said first layer.

8. A process in accordance with claim 7 which includes electrophoretically depositing upon the second coating a third coating composed of refractory ceramic particles of material of the group consisting of molybdenum disilicide, aluminum oxide and silicon carbide, and sintering said third coating to form a third layer bonded to said second layer.

References Cited in the file of this patent

UNITED STATES PATENTS

| | | |
|---|---|---|
| 1,922,221 | Steenbeck et al. | Aug. 15, 1933 |
| 2,202,054 | Hensel et al. | May 28, 1940 |
| 2,372,607 | Schwarzkopf | Mar. 27, 1945 |
| 2,488,731 | Lambert et al. | Nov. 22, 1949 |
| 2,576,362 | Rimbach | Nov. 27, 1951 |
| 2,640,024 | Palmateer | May 26, 1953 |
| 2,689,178 | Hignett | Sept. 14, 1954 |
| 2,708,726 | Atherton | May 17, 1955 |
| 2,711,980 | De Santis et al | June 28, 1955 |

FOREIGN PATENTS

| | | |
|---|---|---|
| 1,044,212 | France | June 17, 1953 |